US006845299B2

(12) United States Patent
Christiane et al.

(10) Patent No.: US 6,845,299 B2
(45) Date of Patent: Jan. 18, 2005

(54) COMPUTER-ASSISTED CONFIGURING TOOL

(75) Inventors: Foertsch Christiane, Erlangen (DE); Christiane Gast, Nuremberg (DE); Toni Kress, Lauf (DE); Michael Louis, Fisch (DE); Dieter Walter, Hessdorf (DE)

(73) Assignee: Siemens Aktiengesellschaft, Munich (DE)

( * ) Notice: Subject to any disclaimer, the term of this patent is extended or adjusted under 35 U.S.C. 154(b) by 86 days.

(21) Appl. No.: 10/239,237

(22) PCT Filed: Mar. 20, 2001

(86) PCT No.: PCT/DE01/01071

§ 371 (c)(1),
(2), (4) Date: Jan. 2, 2003

(87) PCT Pub. No.: WO01/71879

PCT Pub. Date: Sep. 27, 2001

(65) Prior Publication Data

US 2003/0125844 A1 Jul. 3, 2003

(30) Foreign Application Priority Data

Mar. 20, 2000 (DE) .......................................... 100 13 535

(51) Int. Cl.⁷ ............................................. G05D 11/00
(52) U.S. Cl. ..................... 700/286; 700/292; 345/333
(58) Field of Search ................................ 700/286, 292; 345/333

(56) References Cited

U.S. PATENT DOCUMENTS 4,626,766 A * 12/1986 Musil .......................... 323/222
5,317,525 A * 5/1994 Taoka et al. .................. 703/18
5,844,554 A * 12/1998 Geller et al. ................. 345/744
6,141,634 A * 10/2000 Flint et al. .................... 703/18
2002/0087220 A1 * 7/2002 Tveit et al. .................. 700/22
2003/0040897 A1 * 2/2003 Murphy et al. .............. 703/18
2003/0125844 A1 * 7/2003 Foertsch et al. ............ 700/292

FOREIGN PATENT DOCUMENTS

DE 4209168 9/1993

OTHER PUBLICATIONS

DigiKey Catalog—www.digikey.com, retrieved from the wayback machine (www.alexa.com) from Mar. 1, 2000.*

"Low Voltage Automatic Transfer Switch Systems"—ASCO, 1998.*

"A Data Center Gets Powered Up For Non-Stop Business"—ION Case Study, www.pwrm.com.*

"Management of Electrical Systems In Industrial Plants"—Lindh et al, Lappeenranta University of Technology.*

* cited by examiner

Primary Examiner—Leo Picard
Assistant Examiner—Michael D. Masinick
(74) Attorney, Agent, or Firm—Harness, Dickey & Pierce, P.L.C.

(57) ABSTRACT

A low-voltage power installation in which elements are to be interconnected via an energy distribution system with several sections configured by a specification of the elements and the sections. The elements and the sections are specified by access to a catalogue from which predefined specifications can be selected via an interface. The design of the sections can be checked, supplemented or corrected according to a dimensioning criterion.

29 Claims, 4 Drawing Sheets code: ------
type: ------
approval: ------
power: ------
switch: ------
protect: ------
comma: ------

COMPUTER-ASSISTED CONFIGURING TOOL

This application is the national phase under 35 U.S.C. § 371 of PCT International Application No. PCT/DE01/01071 which has an International filing date of Mar. 20, 2001, which designated the United States of America and which claims priority on German Patent Application number DE 100 13 535.8 filed Mar. 20, 2000, the entire contents of which are hereby incorporated herein by reference.

FIELD OF THE INVENTION

The present invention generally relates to a computer-assisted configuring tool. More preferably, it relates to one for configuring a low-voltage power installation having an energy distribution system with a number of sections, via which loads, switching and protective modules arranged if appropriate ahead of the loads and a feeding module are to be interconnected, by a user.

BACKGROUND OF THE INVENTION

In industrial installations, in particular machines and machine systems, a large number of electrical low-voltage loads have to be supplied with electric power. The loads are often, but not exclusively, single-phase or three-phase AC voltage motors. It is also known, for example, for them to be supplied with 500 V DC voltage.

The energy distribution to the loads previously took place in switch cabinets, in which the feeding module for the loads was also arranged. Proceeding from the switch cabinet, separate lines were led to the individual loads. The topology of the line system was consequently star-like. On account of this topology, that is a separate line per load, the dimensioning of the line was relatively easy. It could even be performed by electrical installation engineers on the basis of comparatively simple tables.

Recently, it has become increasingly common for the electrical loads to be connected to the feeding module by means of bus- or network-like line systems. Consequently, from the feeding module there extends a trunk section of the line system, via which a network—which is even possibly made to branch further—is led to the individual loads. The trunk section carries the total current of the connected loads. Further sections branch away to the individual loads, referred to hereafter as individual or end sections, which carry the current for only this one load.

Dimensioning and testing a line system of this type is considerably more complex and expensive than in the case of a star-like topology. It is too much to expect electrical installation engineers to carry this out. Although electrical engineers have in principle the required technical know-how, there are no standardized, easily manageable and readily applicable dimensioning rules. Consequently, even for electrical engineers, proper dimensioning and testing of the dimensioning is possible only by spending considerable time.

It is admittedly conceivable simply to add together the individual lengths of the sections and the rated outputs of the loads and dimension the line system in a standard manner as though it were required for a single load with the total of the rated outputs to be supplied with electric power via a line with the total of the individual lengths of the sections. Although in this case the dimensioning would be easy, it is highly probable that the line system as such would be significantly overdimensioned.

SUMMARY OF THE INVENTION

An object of an embodiment of the present invention is to provide a computer-controlled configuring tool by which low-voltage power installation can be properly configured in an easy way.

An object may be achieved by a configuring tool by which the loads, the switching and protective modules and the feeding module can be specified and the sections can be at least partially specified, the specification of the energy distribution system can be checked, supplemented and/or corrected according to at least one dimensioning criterion and a catalog interface allows access to at least one catalog, from which predefined descriptions of loads, switching and protective modules, feeding modules and sections can be selected.

A testing method, by which a bus- or network-like line system can be tested for adequate dimensioning, and, if appropriate, can even be dimensioned of its own accord, is described in the application filed at the same time as the present application "Rechnergestütztes Prüfverfahren für Leitungssystem" [computer-assisted testing method for a line system] (internal file reference 2000P03188 DE, priority of Mar. 20, 2000, priority file reference DE 100 13 521.8), the entire contents of which are hereby incorporated herein by referance. In the application likewise filed at the same time "Rechnergestütztes Prüfverfahren für ein Leitungssystem" [computer-assisted configuring tool for a line system] (internal file reference 2000 P 22750 DE), the entire contents of which are hereby incorporated herein by reference, this testing method is even extended to the extent that the topology of the line system can be optimized interactively or of its own accord. With respect to the checking, supplementing and correcting of the energy distribution system, reference is made to these two applications.

If the dimensioning criterion can be retrieved by the configuring tool from a criterion file via a criterion interface, the configuring tool can be used particularly flexibly.

If the dimensioning criterion can be selected by the user by selection from a number of predefined dimensioning criteria, the dimensioning criterion can be flexibly prescribed in a particularly easy way.

If the descriptions of loads, switching and protective modules, feeding modules and sections of the catalog are assigned indicators as to which of the predefined dimensioning criteria they satisfy in principle, and only descriptions of loads, switching and protective modules, feeding modules and sections which satisfy in principle the selected dimensioning criterion can be selected by the configuring tool during the configuring of the low-voltage power installation, it is ensured that the individual elements of the power installation are configured in a simple way conforming to standards.

If it is possible by use of the configuring tool to generate via a project data interface at least one project file, in which a description of the loads, the switching and protective modules, the feeding module and the sections can be stored and from which they can be retrieved again. The result of the configuring can be stored and, if appropriate, used again later, or generally archived.

If the dimensioning criterion can also be stored in the project file and retrieved again from it, it can also be subsequently verified why the power installation was configured in the way stored in the project file.

If bibliographical data can also be assigned to the installation by use of the configuring tool and can likewise be stored in the project file and retrieved again from it, the result can be assigned clearly predetermined nontechnical particulars, for example the configuring engineer or the configuring date.

If the loads, the switching and protective modules and the feeding module are at least partially capable of communication, and it is also possible by use of the configuring tool to create a configuration of a communication link between the elements concerned, the configuring tool is even more powerful.

If the communication link can also be stored in a file and retrieved again from it, the result of the communication configuration can also be stored, reused and archived. The file may in this case optionally be the project file or a communication file other than this file.

If, during the configuring of the communication link, elements other than the loads, the switching and protective modules and the feeding module can be taken into account, the configuring tool is again more powerful.

If the predefined descriptions contained in the catalog also comprise the communication descriptions of the elements contained in the catalog, prescribing the communication descriptions is particularly easy.

If it has a communication interface with respect to a configuring tool for configuring communication data, it is particularly easy for the configuring of the communication to be coordinated with the configuring of communication elements with other configuring tools.

If the checking, supplementing and/or correcting of the specification of the energy distribution system can be used by another configuring tool via a configuring interface, the configuring tool can be used more universally.

If a circuit diagram, a cable list, a connection list, a parts list, a terminal diagram and/or a communication diagram can be created by use of the configuring tool, the configuring tool is particularly powerful.

If the configuring tool operates on a window-oriented basis, it can be operated particularly conveniently.

BRIEF DESCRIPTION OF THE DRAWINGS

Further advantages and details emerge from the following description of an exemplary embodiment. In an associated basic representation.

DETAILED DESCRIPTION OF THE PREFERRED EMBODIMENTS

Figure 1:
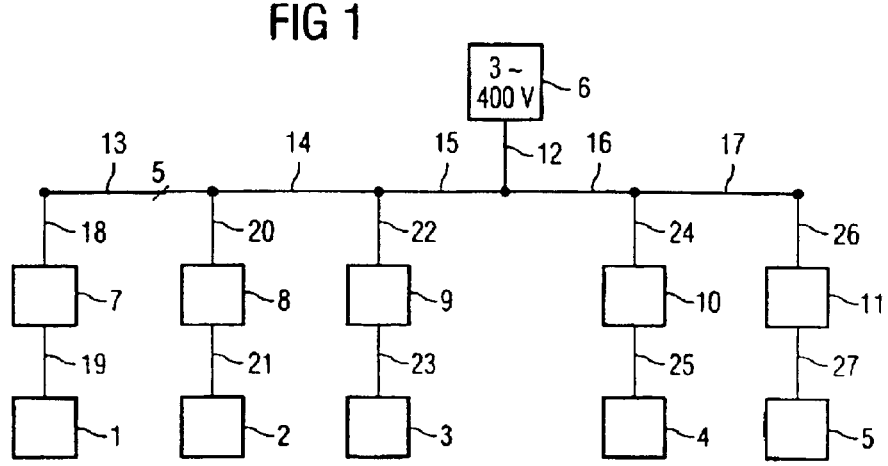
FIGS. 1–3 show by way of example a low-voltage power installation.

According to FIG. 1, it is intended (by way of example) for five main loads 1 to 5 to be supplied with electric power from a feeding module 6. Each of the main loads 1 to 5 is preceded by a switching and protective module 7 to 11. The loads 1 to 5 are generally, but not necessarily, motors. The switching and protective modules 7 to 11 generally comprise a contactor, which is preceded by a power switch.

For supplying the main loads 1 to 5 with electric power, there is a main line system. Via this system, the main loads 1 to 5 are fed with a main low voltage. The main low voltage is a voltage below 1 kV, for example a three-phase AC voltage with a rated voltage of, for example, 400 volts. In this case, the main line system is typically of a 5-wire design (3 phases, neutral conductor, ground).

According to FIG. 1, the main low-voltage system has a main trunk section 12, main connecting sections 13 to 17 and main end sections 18 to 27. It can be seen here that the switching and protective modules 7 to 11 precede the main loads 1 to 5.

The switching and protective modules 7 to 11 are auxiliary loads, which are supplied with electric power via auxiliary line systems. According to FIG. 2, it can be seen that the auxiliary line systems have the same basic structure as the main line system. It just has to be additionally noted that the switching and protective module 7 is not supplied via these two auxiliary line systems but in some other way with electric power. Furthermore, other components 28, 29, which are not looped into the main line system, are—as it were as an alternative—connected to one or both of the auxiliary line systems. The other components 28, 29 may be, for example, actuators or sensors. The auxiliary loads 8 to 11, 28, 29 may also be connected to one or both auxiliary line systems.

The auxiliary line systems generally carry a lower voltage than the main line system. Typical voltage values are a single-phase AC voltage of, for example, 230 volts or a DC voltage of, for example, 24 volts. In both cases, the auxiliary line systems may be of a two-wire design.

The line systems consequently share the feeding module 6. Furthermore, according to FIG. 2, the auxiliary line systems have common loads 8, 10, 29. The loads 8 to 11 of the auxiliary line systems are also switching and protective modules 8 to 11 of the main line system, which is represented in FIG. 1.

Figure 2:
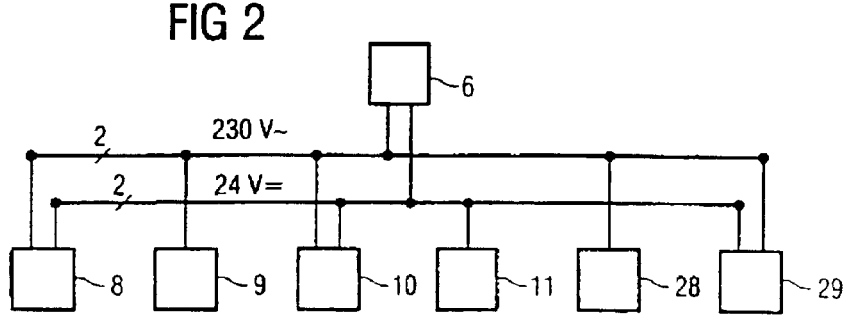
Figure 3:
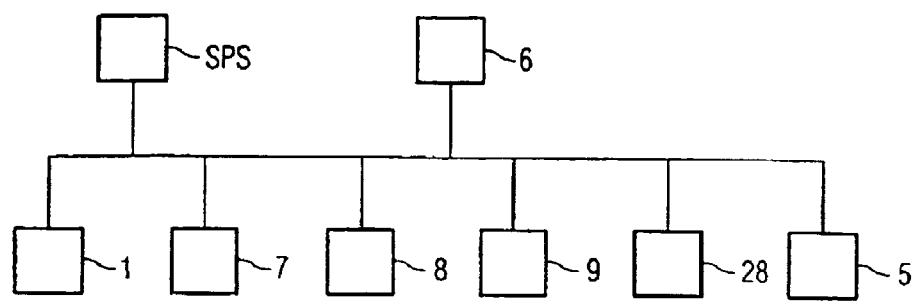

The components 1 to 11, 28, 29 represented in FIGS. 1 and 2 may, if appropriate, also be capable of communication. If they are capable of communication, they are therefore connected according to FIG. 3 via a communication network to one another and to a higher-level control unit SPS. According to FIG. 3, these are the elements 1, 5 to 9 and 28. The higher-level control unit SPS may be, for example, a programmable controller. The communication network may, for example, satisfy the PROFIBUS specification or the AS-i specification. According to FIG. 3, the communication network is different from the auxiliary line systems. If appropriate, however, it could also be integrated in the latter.

The low-voltage power installation described above is now to be configured with the configuring tool according to an embodiment of the invention.

Figure 4:
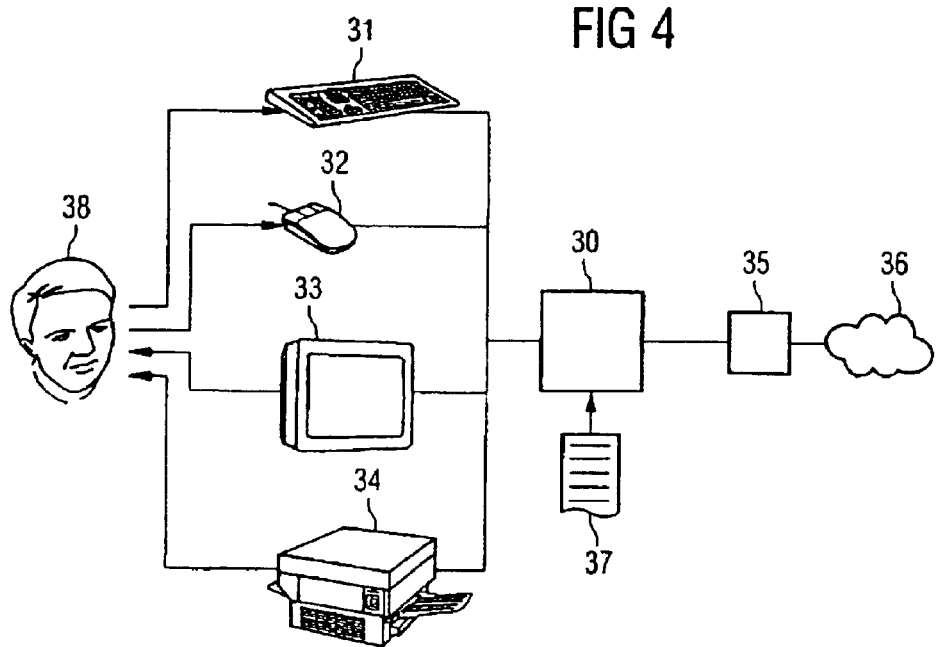
FIG. 4 shows a computer set-up.

For this purpose, the configuring tool according to FIG. 4 is processed by a computer, for example a PC. The latter has the usual components. These are a computer core 30, input devices 31, 32 (typically a keyboard 31 and a mouse 32), output devices 33, 34 (typically a monitor 33 and a printer 34) and also, if appropriate, an interface 35 with respect to a computer network 36, for example the Internet. By processing a program 37, by which the configuring tool according to an embodiment of the invention is realized, the computer communicates with a user 38.

Figure 5:
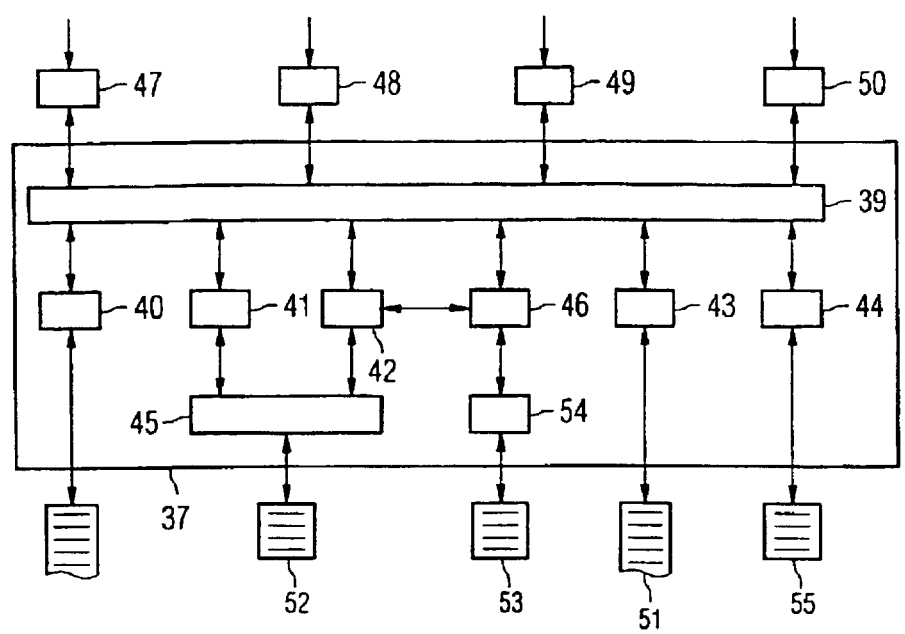
FIG. 5 shows a block diagram of a configuring tool.

According to FIG. 5, the configuring tool 38 has a main program 39 and a number of subprograms 40 to 46. The main program 39 essentially has an interfacial and coordinating function. With respect to the coordinating function, it coordinates the interaction of the subprograms 40 to 44. With respect to the interfacial function, it has a number of interfaces. Firstly, the main program 39 has a user interface 47, by which bidirectional interactive communication with the user 38 takes place. Communication with another configuring tool is possible via a configuring interface 48. This allows in particular the subprograms 42 and 46 also to be used by this other configuring tool. Communication data can be exchanged via a communication interface 49 with a configuring tool for configuring data of this type. Finally, communication with other configuring tools is possible via a general interface 50.

The subprograms 40 to 46 have the following functions:

The subprogram 40 is a documentation generator. By use of the documentation generator 40, reports, circuit diagrams, cable lists, connection lists, parts lists, terminal diagrams and/or communication diagrams can be generated for example.

The subprogram 41 is an input tool. By use of the input tool 41, on the one hand bibliographical data and on the other hand technical data can be input into the power installation by interactive entry by the user 37. The bibliographical data include, for example, the configuring engineer who is configuring the power installation, the configuring date, a designation of the power installation and sometimes also designations of individual blocks of the power installation. The technical data include specifications of the loads 1 to 5, of the switching and protective modules 7 to 11, of the components 28, 29 and of the feeding module 6. With respect to the sections 12 to 27 (and also the sections of the auxiliary line systems), the prescribed data include at least the type of cable and the lengths of the individual sections 12 to 27; if appropriate, further particulars may also be specified, such as for example cable cross sections and laying conditions and the like. For details, reference is made to the application "Rechnergestütztes Prüfverfahren für ein Leitungssystem" mentioned above.

The elements 1 to 11, 28, 29 and the sections 12 to 27 are specified by accessing a catalog 51 via the catalog interface 43 and reading out from the catalog 51 via the catalog interface 43 predefined descriptions of the elements 1 to 27, 28, 29 to be specified and offering them to the user 38 for selection. The user 38 then selects individual descriptions with respect to the loads 1 to 5, the switching and protective modules 7 to 11, the components 28, 29 and the feeding module 6 and, as a result, specifies these elements 1 to 11, 28, 29. The same procedure is possible with respect to the sections 12 to 27. In this case, the sections 12 to 27 are also completely specified. Alternatively, however, it is also possible with respect to the sections 12 to 27 to prescribe only some of the criteria, that is the length, cable type and number of wires. In this case—in the absence of a specified indication of the wire cross section of the wires of the sections 12 to 27—there is only a partial specification of the sections 12 to 27.

The configured data, that is, for example with respect to the main line system, the descriptions of the elements 1 to 27 and of the topology of the main line system, are stored together with the bibliographical data via the project data interface 45 in a project file 52. As a result, the bibliographical data are assigned to the technical data of the power installation. The project file 52 is in this case created or generated when the configuring tool 37 is stored for the first time. It goes without saying that the project file 52 can also be read again later, in other words the descriptions stored in it can be retrieved again.

If the sections 12 to 27 are prescribed by use of the input tool 41, it is not ensured that the specified particulars satisfy technical calculation and safety regulations. These regulations represent dimensioning criteria for the sections 12 to 27 and consequently the overall specification of the energy distribution system. To ensure a proper design of the energy distribution system, it is necessary to provide the dimensioning program 42, which interacts with the test program 46. By use of the test program 46, it can be checked whether a prescribed dimensioning of the energy distribution system meets specific calculation and safety regulations. These regulations are in this case stored in a criterion file 53 and can be retrieved by the test program 46 via a criterion interface 54. In the criterion file 53 there are preferably stored a number of sets of dimensioning criteria, so that the user 38 can select a set of predefined dimensioning criteria by interactive selection. For details of the implementation of the test program, reference is made to the already mentioned patent application "Rechnergestütztes Prüfverfahren für ein Leitungs-system".

When the user 38 has completely specified the energy distribution system or its sections 12 to 27 and checking by the test program 46 has shown that proper configuration has been carried out, the dimensioning program 42 merely stores the dimensioning criteria in the project file 52. This is done in addition to the particulars that are already stored there, so that the criteria can again be retrieved later from the project file 52. Otherwise, there are several options.

Firstly, it is possible that the user 38 has previously indicated interactively that he wishes only for a calculation or checking of the power supply system, but no optimization. In this case, there merely takes place an interactive output of an error message to the user 38 by the dimensioning program 42. Otherwise, an incomplete specification of the sections 12 to 27 is supplemented or a complete specification is corrected in such a way that, after supplementing or correcting the specification, the selected dimensioning criteria are satisfied. Here, too, for details reference is again made to the already mentioned patent application "Rechnergestütztes Prüfverfahren für ein Leitungs-system".

Figures 6, 7:
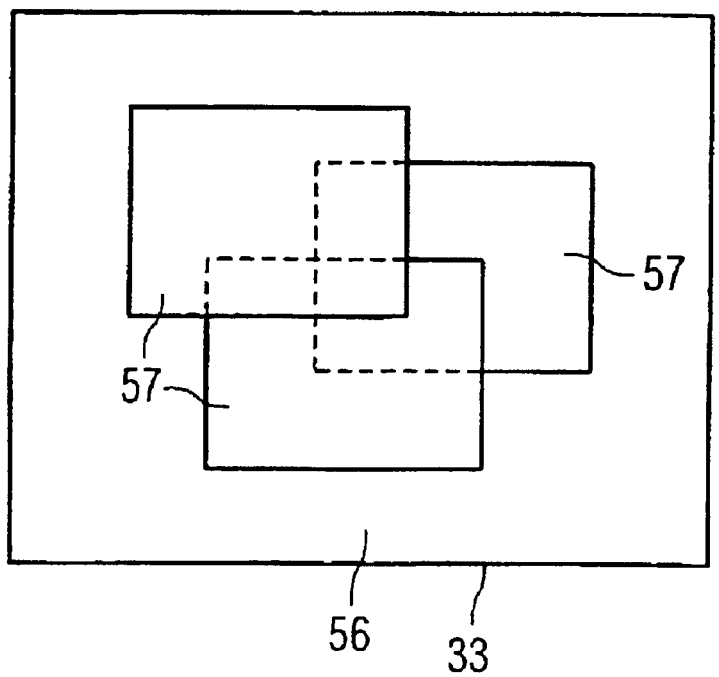
FIG. 6 shows an example of a predefined element description.
FIG. 7 shows an operator interface.

According to FIG. 6, the descriptions of the elements 1 to 29 include a code. The code is a unique way of selection for a specific element description. The code is typically what is known as an MLFB (=maschinenlesbare Fabrikatbezeichnung [machine-readable designation of make]). It also includes a brief description of the type of element described, that is for example whether it is a motor, a switching and protective module, a line or a feeding module. The description also includes an approval code. The approval code comprises country abbreviations for example. If the approval code contains the respective country abbreviation, the element written conforms to the relevant electrotechnical regulations valid in the respective country. The approval code is consequently an indicator as to which country-specific regulations the element described satisfies.

On account of the fact that the dimensioning criteria to be satisfied are also country-specific, it is therefore possible that the user 38 initially inputs for example just a country code when configuring an installation. It is then determined or selected by the input of the country code which set of dimensioning criteria is applied in the testing of the energy distribution system. Furthermore, it is possible by the country code prescribed by the user 38 to offer for selection to the user 38 during the configuring of the power installation only descriptions of those elements which satisfy in principle the input country code and consequently indirectly the corresponding and consequently selected dimensioning criteria.

According to FIG. 6, on the basis of the approval code there firstly takes place a description of the respective element from technical energy-related aspects, then of its switching properties, its protective parameters and its communication properties. If appropriate, individual properties of those described can be omitted, if these properties are not realized.

If the elements 1 to 11, 28, 29 are capable of communication, that is in the present case the elements 1, 5 to 9 and 28, it goes without saying that they must also be configured and linked for communication. The creation of this configuration is also possible by means of the configuring tool 37 according to the invention. In particular, it is possible by way of the communication configurator 44 to prescribe for the elements 1, 5 to 9, 28 via which communication bus they are to be connected to one another and to the higher-level controller SPS and at which addresses they are to be accessible. Consequently, configuration of the communication link between the elements concerned 1, 5 to 9, 28 can also be created by use of the configuring tool 37. The data thereby created can likewise be stored in a file and retrieved again from it. In this case, this may optionally be the project file 52 or a communication file 55 other than the project file 52. FIG. 7 shows by way of example a screen content typically occurring during the interactive communication by the user 38. According to FIG. 7, a number of windows 57 are opened on a screen 56 of the monitor 33 and are represented. The configuring tool 37 consequently operates on a window-oriented basis, so that convenient interaction between the user 38 and the configuring tool 37 is possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-assisted configuring tool for configuring a low-voltage power installation having an energy distribution system with a number of sections, the tool comprising:
    a catalog interface, adapted to allow access to at least one catalog, from which predefined descriptions of loads, switching and protective modules, feeding modules and sections are at least one of selectable, specifiable, and partially specifiable; wherein
    the configuring tool is adapted to interconnect loads, switching and protective modules and a feeding module, and
    the specification of the energy distribution system is at least one of checkable, supplementable and correctable according to at least one dimensioning criterion.

2. The configuring tool as claimed in claim 1, further comprising:
    a criterion interface, adapted to permit retrieval of dimensioning criterion from a criterion file.

3. The configuring tool as claimed in claim 1, wherein the at least one dimensioning criterion is selectable by a user, from a number of predefined dimensioning criteria.

4. The configuring tool as claimed in claim 3, wherein descriptions of loads, switching and protective modules, feeding modules and sections of the catalog are assigned indicators as to which of the predefined dimensioning criteria they satisfy in principle, and wherein only descriptions of loads, switching and protective modules, feeding modules and sections which satisfy in principle the selected dimensioning criterion are selectable by the configuring tool during the configuring of the low-voltage power installation.

5. The configuring tool as claimed in claim 1, further comprising:
    a project data interface, adapted to generate at least one project file, in which a description of the loads, the switching and protective modules, the feeding module and the sections are storable and from which they are retrievable.

6. The configuring tool as claimed in claim 5, wherein the project file is adapted to store and enable retrieval of the at least one dimensioning criterion.

7. The configuring tool as claimed in claim 5, wherein the configuring tool is further adapted to assign bibliographical data to the installation, wherein the bibliographical data is storable in and retrievable from the project file.

8. The configuring tool as claimed in claim 1, wherein the loads, the switching and protective modules and the feeding module are at least partially capable of communication and wherein the configuring tool is adapted to create a configuration of a communication link between the elements concerned.

9. The configuring tool as claimed in claim 8, wherein the communication link is storable in and retrievable from a file.

10. The configuring tool as claimed in claim 9, wherein the file is a project file.

11. The configuring tool as claimed in claim 9, wherein the file is a communication file.

12. The configuring tool as claimed in claim 8, wherein, during configuration of the communication link, elements other than the loads, the switching and protective modules and the feeding module, are includable.

13. The configuring tool as claimed in claim 8, wherein the predefined descriptions contained in the catalog also comprise the communication descriptions of the elements contained in the catalog.

14. The configuring tool as claimed in claim 1, further comprising:
    a communication interface for configuring communication data.

15. The configuring tool as claimed in claim 1, wherein at least one of the checking, supplementing and correcting of the specification of the energy distribution system is useable by another configuring tool via a configuring interface.

16. The configuring tool as claimed in claim 1, wherein the configuring tool is adapted to create at least one of a circuit diagram, a cable list, a connection list, a parts list, a terminal diagram and a communication diagram.

17. The configuring tool as claimed in claim 1, wherein the configuring tool operates on a window-oriented basis.

18. The configuring tool as claimed in claim 2, wherein the dimensioning criterion are selectable by a user, from a number of predefined dimensioning criteria.

19. The configuring tool as claimed in claim 6, wherein the configuring tool is further adapted to assign bibliographical data to the installation, wherein the bibliographical data is storable in and retrievable from the project file.

20. A computer-assisted configuring tool for configuring a low-voltage power installation having an energy distribution system with a number of sections, comprising:
    first means for interconnecting loads, switching and protective modules and a feeding module, wherein the loads, the switching and protective modules and the feeding module are specifiable and the sections are at least partially specifiable:
    second means for at least one of checking, supplementing and correcting the specification of the energy distribution system according to at least one dimensioning criterion; and
    a catalog interface, adapted to allow access to at least one catalog, from which predefined descriptions of loads, switching and protective modules, feeding modules and sections are selectable.

21. The configuring tool as claimed in claim 20, further comprising:
    a criterion interface, adapted to permit retrieval of dimensioning criterion from a criterion file.

22. The configuring tool as claimed in claim 20, further comprising:
    third means for selecting the at least one dimensioning criterion from a number of predefined dimensioning criteria.

23. The configuring tool as claimed in claim 20, further comprising:

a project data interface, adapted to generate at least one project file, in which a description of the loads, the switching and protective modules, the feeding module and the sections are storable and from which they are retrievable.

24. The configuring tool as claimed in claim 23, wherein the project file is adapted to store and enable retrieval of the at least one dimensioning criterion.

25. The configuring tool as claimed in claim 24, further comprising:

third means for assigning bibliographical data to the installation, wherein the bibliographical data is storable in and retrievable from the project file.

26. The configuring tool as claimed in claim 20, further comprising:

third means for creating at least one of a circuit diagram, a cable list, a connection list, a parts list, a terminal diagram and a communication diagram.

27. The configuring tool as claimed in claim 20, wherein the configuring tool operates on a window-oriented basis.

28. The configuring tool as claimed in claim 1, wherein the configuring tool is at least a program or a sub-program to be executed within a processor.

29. The configuring tool as claimed in claim 20, wherein the first means and second means are at least one of a program or a sub-program.

* * * * *